(12) United States Patent
Okuyan et al.

(10) Patent No.: US 10,962,860 B2
(45) Date of Patent: Mar. 30, 2021

(54) SYSTEM AND METHOD FOR OPTIMIZING FOCUS OF OPTICAL SYSTEM PASSIVELY

(71) Applicant: ASELSAN ELEKTRONIK SANAYI VE TICARET ANONIM SIRKETI, Ankara (TR)

(72) Inventors: Erkan Okuyan, Ankara (TR); Murat Gevrekci, Ankara (TR); Berk Ulker, Ankara (TR); Cevdet Aykanat, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 142 days.

(21) Appl. No.: 16/096,304

(22) PCT Filed: May 25, 2016

(86) PCT No.: PCT/TR2016/050155
§ 371 (c)(1),
(2) Date: Oct. 25, 2018

(87) PCT Pub. No.: WO2017/204756
PCT Pub. Date: Nov. 30, 2017

(65) Prior Publication Data
US 2020/0049947 A1    Feb. 13, 2020

(51) Int. Cl.
*G02B 7/02*      (2021.01)
*G03B 13/36*    (2021.01)
(Continued)

(52) U.S. Cl.
CPC .............. *G03B 13/36* (2013.01); *G02B 7/36* (2013.01); *H04N 5/2254* (2013.01); *H04N 5/232133* (2018.08)

(58) Field of Classification Search
CPC . G02B 7/04; G02B 7/08; G02B 7/102; G02B 7/10; G02B 7/023; G02B 7/09;
(Continued)

(56) References Cited

U.S. PATENT DOCUMENTS

| 8,270,826 B2 * | 9/2012 | Hjelmstrom ......... H04N 17/002 |
| | | 396/242 |
| 2008/0151097 A1 | 6/2008 | Chen et al. |
| 2012/0038818 A1 | 2/2012 | Hamada |

FOREIGN PATENT DOCUMENTS

| EP | 1855466 A2 | 11/2007 |
| EP | 2354843 A1 | 8/2011 |

(Continued)

OTHER PUBLICATIONS

Anonymous:"Longest increasing subsequence—Wikipedia", Feb. 23, 2016 (Feb. 23, 2016), XP055311267, Retrieved rom the Internet: URL: https://en.wikipedia.org/w/index.php?title=Longest_increasing_subsequence&oldid=706541892 [retrieved on Oct. 17, 2016] the whole document.

*Primary Examiner* — William R Alexander
*Assistant Examiner* — Tamara Y. Washington
(74) *Attorney, Agent, or Firm* — Bayramoglu Law Offices LLC

(57) ABSTRACT

A method for optimizing focus of an optical system passively includes the following steps: discretizing optical positions with respect to precision requirements; initializing an idle counter to zero, going to the initial optical position, initializing a best position to current position, clearing a sharpness array; calculating correspondence; adding a sharpness value to a sharpness array; calculating a longest increasing subsequence on the sharpness array; checking if the longest increasing subsequence length increases; clearing the idle counter; setting the best position to the current position; incrementing the idle counter; checking if the
(Continued)

termination threshold is reached; checking if the current position corresponds to the end of discrete optical positions if the termination threshold is not reached; driving motors to the next position; optionally improving the best position; going to the best position and terminating the method.

7 Claims, 4 Drawing Sheets

(51) Int. Cl.
*H04N 5/232* (2006.01)
*G02B 7/36* (2021.01)
*H04N 5/225* (2006.01)

(58) Field of Classification Search
CPC ...... G02B 7/021; G02B 27/646; G02B 27/02; H04N 5/2254; H04N 5/23212; H04N 5/2257; H04N 5/23296; G03B 3/10; G03B 2205/0053; G03B 2205/0046; G03B 5/00; G03B 17/14; G03B 17/04; G03B 13/32; G03B 13/34
USPC ........................................................ 359/823
See application file for complete search history.

(56) References Cited

FOREIGN PATENT DOCUMENTS

| | | | |
|---|---|---|---|
| JP | 2010078810 A | * | 4/2010 |
| JP | 2010078810 A | | 4/2010 |

* cited by examiner

SYSTEM AND METHOD FOR OPTIMIZING FOCUS OF OPTICAL SYSTEM PASSIVELY

CROSS REFERENCE TO RELATED APPLICATIONS

This application is the national phase entry of International Application No. PCT/TR2016/050155, filed on May 25, 2016, the entire contents of which are incorporated herein by reference.

TECHNICAL FIELD

The present invention relates to the field of computation and covers methods to achieve automatic optical focus on an imaging system by evaluating sharpness of images obtained for different focus distances.

BACKGROUND

It is known that there are methods and models to achieve automatic focus for an optical system and improve the quality of captured image(s) either in single or continuous manner. These kind of focus systems are used for example in digital cameras in commercial systems and, surveillance systems, etc. Once focus on the desired scene is obtained automatically, high quality image(s) can be obtained without user intervention. These kinds of automatic focusing system are crucially important when application at hand obstructs user intervention or target user profile is untrained to make such intervention possible. Setting the optical motor to an improper value creates overly blurred representation of a scene.

There are different methods to achieve focus for optical systems using active, passive or hybrid means. For an active focusing system, distance to the subject (target of focus) is measured, without using the optical system, through some other range finding sensor. Then focus of the optical system is adjusted with this new range information. Because, these kinds of focusing systems use an additional sensor, cost of such systems are expected to be higher.

A passive focusing system, works by analysing the captured image acquired through the optical system. For many passive focusing systems, a plurality of images are captured using different focuses of the optical system. These images are analysed by the system to determine the best fitting focus distance for the scene. Because, these systems do not direct energy to the environment, they are preferable in many surveillance applications since these systems do not reveal its position and do not trigger any counter measure systems.

Hybrid focusing systems, both use a separate sensor to find range to the subject in the scene and perform passive image analysis. Since they have multiple sources of information regarding how best focus should be achieved, fusing multiple sources of information is required. However they are expected to have higher quality than their counterparts.

Currently, passive, active and hybrid methods can be used to find best possible focus for an optical system. This invention relates specifically to the camera-based (day-tv, thermal, IR, Time of Flight etc.) passive focusing systems.

An optical system with passive focusing capability has at least three components: a sensor, a control system and a motor with adjustable optical elements. A sensor is required since image (captured by the sensor) analysis is necessary for a passive focusing system. A control system is required since motor drivers needs to be implemented that dynamically focuses the optical system to a system specified distance. A motor with adjustable optical elements is also required for tuning the optical system to be focussed at a certain distance with the commands of the control system.

An optical system with passive focusing capability has to analyse sharpness values of plurality of images (captured by focusing system for multiple distances). Computing a sharpness indicator for an image is therefore, well known in the state of the art. Throughout the document, whenever a sharpness indicating value is mentioned, it should be understood that as a quality indicator of focus performance.

Determining the best focusing distance (passively) is called the passive focusing problem and it can be explained as follows: Given a system with capability of optical focus to different distances, we can calculate a number of (N—this number is variable and it is not known prior to completion) correspondences between focus distance of the optical system and sharpness value of the captured image. Passive focusing problem requires calculating the best focus for the optical system using N correspondences obtained iteratively. The objective (along with common objective of finding the best focus for the optical system) may vary depending on the application, such as achieving best focus in shortest time possible or achieving best focus using smallest number of correspondences etc. A solution to the passive focusing problem has to determine the order of correspondences to be processed (in other words, has to determine the focus distance to be processed for each iteration) and has to specify a termination condition to avoid traversing whole search space (in other words, to avoid calculating all possible correspondences).

The United States patent document US20080151097 A1 discloses an autofocus searching method includes the following procedures. First, focus values of images, which are acquired during the movement of the object lens, are calculated, in which the focus value includes at least the intensity value of the image derived from the intensities of the pixels of the image. Next, focus searching is based on a first focus-searching step constant and a first focus-searching direction, in which the first focus-searching step constant is a function, e.g., the multiplication, of the focus value and a focus-searching step. If the focus searching position moves across a peak of the focus values, it is then amended to be based on a second focus-searching direction and a second focus-searching step constant, in which the second focus-searching step constant is smaller than the first focus-searching step constant, and the second focus-searching direction is opposite to the first focus-searching direction.

The current methods are not offering an effective way of achieving best focus performance for an optical system while considering side objectives. To provide a solution to this problem, a new methodology should be introduced which avoids traversing whole search space and considers mechanic/optic/motor related constraints.

SUMMARY

An objective of the present invention is to passively analyse images captured by the optical system focused at multiple distinct focus distances to achieve the best possible focus for the optical system.

Another objective of the present invention is to achieve best possible focus for the optical system within the specified constraints of the application, such as, using minimum number of images for analysis or using minimum amount of time for finishing focus optimization.

BRIEF DESCRIPTION OF THE DRAWINGS

A system and method realized to fulfil the objective of the present invention is illustrated in the accompanying figures, in which.

Figure 1:
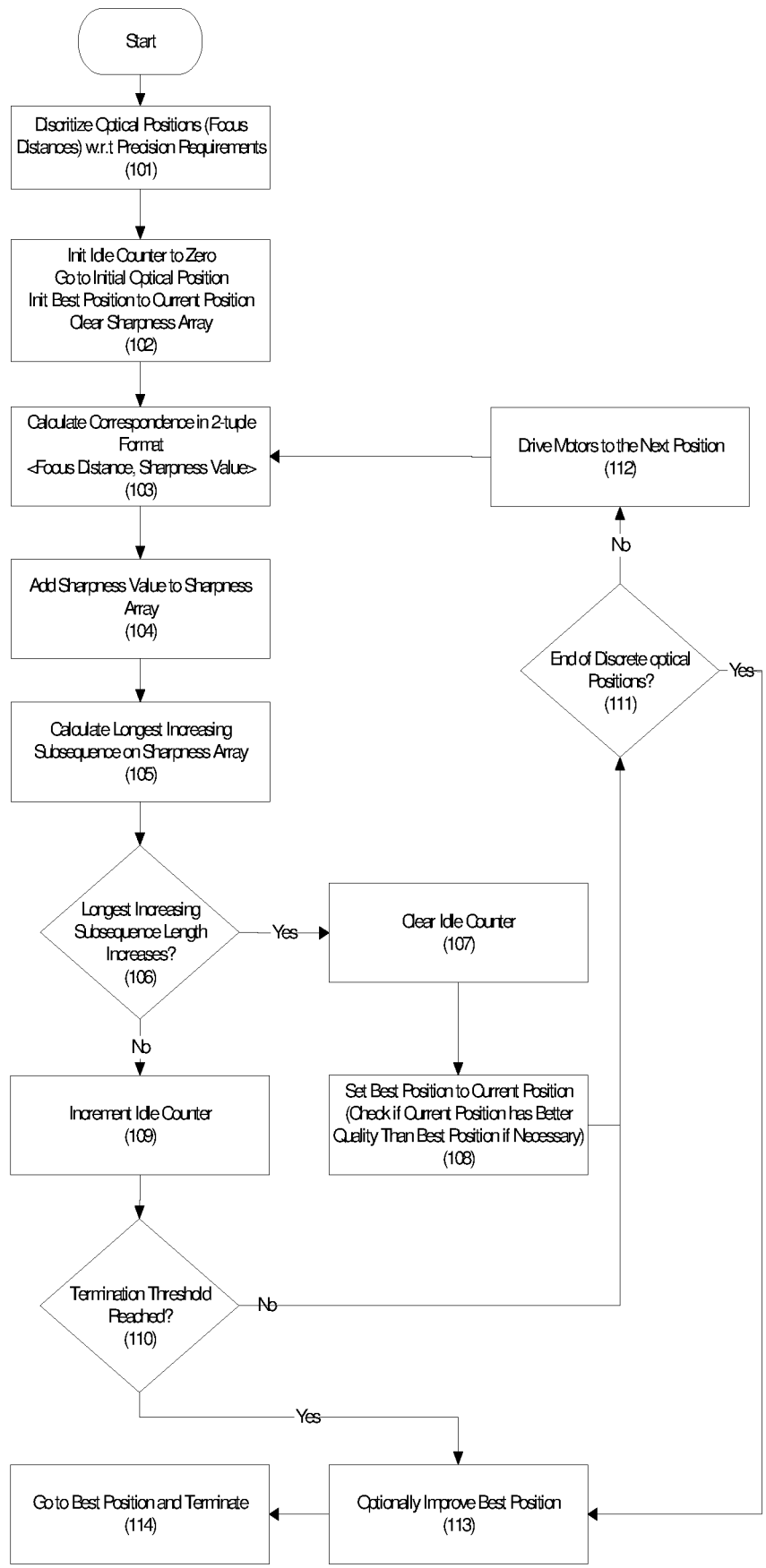
FIG. 1 is the flowchart of the preferred method of the present invention.
Figure 2:
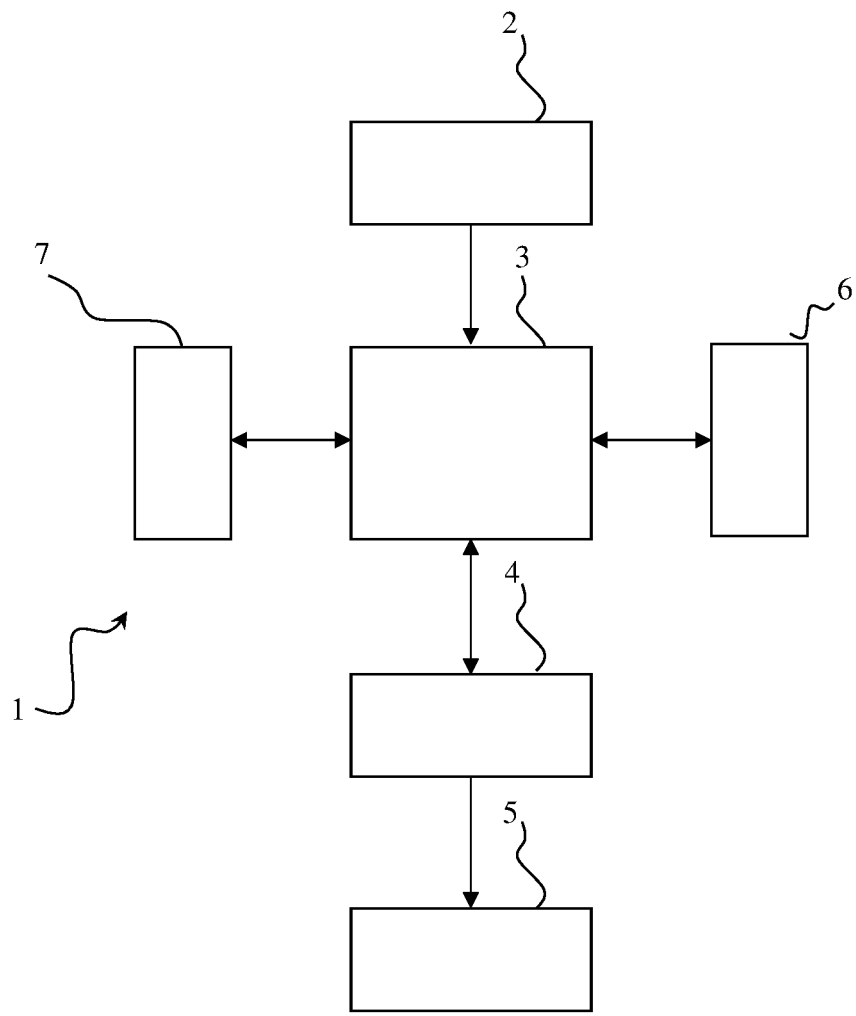
FIG. 2 is the schematic view of the preferred embodiment system.

The components illustrated in the figures are individually referenced where the numbers and letters refer to the following:
1. System for optimizing focus of an optical system passively
2. Sensor unit
3. Processing unit
4. Control unit
5. Motors
6. Input/output device
7. Memory unit
100. Method for optimizing focus of an optical system passively

DETAILED DESCRIPTION OF THE EMBODIMENTS

A method for optimizing focus of an optical system passively (100) comprises the following steps,
- discretizing optical positions (focus distances) of the optical system w.r.t precision requirements (101),
- initializing an idle counter, which holds the number of iterations that optical system is unable to improve focus performance, to zero; driving optical system (1) to a predetermined initial optical position; initializing best position, which holds the best focusing distance came across up until the current execution iteration, to current position; clearing a sharpness array, which holds sharpness values of already processed images (102),
- calculating correspondence for at least one image in 2-tuple format using focus distance and sharpness value, i.e. <Focus Distance, Sharpness Value> (103),
- adding sharpness values to sharpness array (104),
- calculating longest increasing subsequence on sharpness array (105),
- checking if the longest increasing subsequence length increases (106),
- clearing idle counter if longest increasing subsequence length increases (107),
- setting best position to current position (and check if current position has better quality than best position if necessary) (108),
- incrementing idle counter if longest increasing subsequence length doesn't increase (109),
- checking if termination threshold is reached (110),
- checking if the current position corresponds to the end of discrete optical positions if the termination threshold is not reached (111),
- driving motors (5) to the next position if the current position doesn't correspond to the end of discrete optical positions (112),
- improving the best position if the termination threshold is reached or if the current position corresponds to the end of discrete optical positions (113),
- going to the best position and terminate (114).

First, the possible positions of the optical system are mathematically modeled to convert the problem into a discrete optimization problem in step 101. To represent a model mathematically, there are various currently known methods. A very basic example can be stated as follows: Each position of the optical system with a scalar value corresponds to the distance the system is focused at. This step is necessary because theoretically there are infinitely many distances an optical system can be focused at. However, image quality gain using infinitely many candidate distances is miniscule compared to discrete distance steps used for focus (assuming sufficiently fine grain discretization is carried out suiting the needs of the optical system). In one of the preferred configuration of the present invention, discretization of optical positions is user controlled (user may opt to direct system to use finer/coarser discretization steps). In another one of the preferred configuration of the present invention, predetermined discretization steps, found empirically, for the optical system at hand are used.

In step 102, initialization of the method for optimizing focus of an optical system passively (100) takes place. Idle Counter (IC) is a system parameter, which is used as a termination criterion for the method (100). IC holds the number of iterations system is unable to improve focus performance. Because, at the start of the method, number of unsuccessful (in the sense that focus performance is not improved) iterations is zero, IC is set to zero. In step 102, driving optical system to its initial position by the control system takes place. In a preferred configuration of the present invention, initial optical position is the shortest distance that the optical system can be focused at. In another preferred configuration of the present invention, initial optical position is the farthest distance that the optical system can be focused at. For the remainder of this document, focusing distance and optical position of the system refer to the same phenomenon (since optical position of the system determines the focus distance of the system) and used interchangeably. Best Position (BP) of the optical system is a system parameter, which holds the best focusing distance came across up until the current execution iteration (represents the best currently known solution to the problem). Because, at the start of the method, best currently known solution to the passive focusing problem is the initial position of the optical system, BP is set to the current position of the optical system. Sharpness Array (SA) is a system parameter, which holds sharpness values of already processed images. Because, at the start of the method, no images have been processed, SA is empty. Mechanisms that determine how IC, BP and SA are handled during execution of the method will be explained in detail in later parts of this document.

In step 103, calculation of the correspondence for a current frame takes place (in 2-tuple format, i.e. <Focus Distance, Sharpness Value>—for the remainder of this document Focus Distance may be referred to as FD and Sharpness Value may be referred to as SV). Calculated correspondence is a pair of data where first entry corresponds to the focus distance of the optical system for the current frame and second entry corresponds to the sharpness value calculated for the current frame. Focus distance is known within the system because optical position of the system inherently dictates that the focusing distance and control system drives/keeps optical system at a certain position and gives information about the position of the optical system during image capture. However, SV needs to be calculated in step 103. Computing SV for an image is well known in the state of the art.

There are many ways to calculate sharpness indicating value for an image. In one of the preferred configuration of the present invention horizontal and vertical gradient magnitude sum of an image is used to produce a sharpness indicator. Gradients can be computed using local differentiation operator such as sobel operator. In another preferred configuration of the present invention sharpness can be computed using the global image as input, or using local regions as input. For example: We can specify tiles such that image is divided into a matrix of blocks. In such a scenario sharpness can be computed for each block, then a list of sharpness values is obtained. Then we can sort sharpness array and discard the smallest and largest sharpness values and average the remaining to produce a single measure. In yet another preferred configuration of the present invention sharpness value is calculated around a region of interest. This region can involve an aerial object being tracked, whose depth deviates from the background. In such a scenario, user is only interested focusing the object being tracked. Such a depth variation requires segmenting/tracking object and computing sharpness only with the vicinity of the object of interest.

Sharpness value (SV) is added to the sharpness array (SA) in step 104. SA is later used for calculation of longest increasing subsequence of SA. However, in order to have more meaningful information after calculation of longest increasing subsequence of SA, entries inserted to SA has to represent consecutive distances. For example: Using 2-tuple format of <FD, SV>; SA={<10,v1>, <20,v2>, <30,v3>, <40,v4>} is a meaningful sharpness array whereas SA={<20,v2>, <40,v4>, <30,v3>, <10,v1>} is not a meaningful sharpness array (although they contain the same information). Thus, in a preferred configuration of the present invention calculated sharpness values are ordered such that FD values of calculated images are ordered consecutively (i.e. driving motors (5) in step 112 in an ordered fashion). In another preferred configuration of the present invention while inserting SV to SA, a sorting pass is carried out on SA on FD entries to keep ordered structure of SA.

Because of side constraints of passive focusing problem (achieving focus in minimal time or using smallest number of correspondences etc.) calculating all possible correspondences is not desirable. However, we still need to process enough correspondences to achieve sufficiently good results while determining when further improvement cannot be achieved proactively (determine the point where focus quality started to degrade without much delay). In other words, we need to calculate enough correspondences to capture all distances for the increasing trend of focus quality but we need to terminate early without calculating many correspondences for the decreasing trend of focus quality. We achieve such goal by calculating longest increasing subsequence (LIS) on SA in step 105.

Longest increasing subsequence (LIS) of an input sequence (where elements of the sequence has to be comparable; for the present invention the sequence is composed of numbers and they can be compared in a smaller/greater manner) is the set of ordered elements taken from the original sequence where length of LIS is maximal and order of elements in LIS are the same as the original sequence (ex: seq={10,7,5,3,1,7,2,5,9} LIS={1,2,5,9}). Calculation methods of longest increasing subsequence are well known in the state of art. Longest decreasing subsequence (LDS) problem is LIS problems dual and they are essentially the same. Thus, without losing generality, we refer both problems as LIS for the remainder of this document.

Calculating LIS for passive focusing problem achieves three important things (especially when equal step sizes are used):

1—Sharpness values obtained for multiple consecutive distances may be noisy, even though there is clear upward/downward trend. LIS is able to exclude noisy data (ex: seq={5,3,1,7,2,5,9}, upward_trend={1,7,2,5,9}, LIS={1,2,5,9}; noisy element 7 present in the upward_trend is excluded in LIS).

2—For the present invention correspondences are added to SA iteratively (and at each iteration LIS is calculated). LIS length remains constant for a downward trend. Constant LIS length for a number of iterations may signal system for early termination (ex: seq={1,7,2,5,9}, LIS={1,2,5,9}; seq={1,7,2,5,9,8}, LIS={1,2,5,9}; seq={1,7,2,5,9,8,7}, LIS={1,2,5,9}; seq={1,7,2,5,9,8,7,6}, LIS={1,2,5,9}).

3—Most preferred configuration of the present invention is to start searching distance space from an extreme (shortest/longest distance possible for the optical system) and to drive the optical system with equal distance steps to the opposite direction (ex: starts with 100 m focus, next iterations are: 110 m, 120 m . . . ). For optical systems where relative speed of passive image analysis are fast w.r.t driving motors (5) (and motors (5) changing directions), high ability/performance of LIS executing on scanning data is valuable.

In step 106, we determine if LIS length of SA (with the addition of most recently calculated correspondence) increases. An increase in LIS length signals an increasing trend in focus performance and necessary steps needs to be taken to continue execution and further improve focus performance. LIS length remaining the same (LIS length cannot decrease) signals a decreasing trend in focus performance and necessary steps needs to be taken to proactively end the execution (if decreasing trend is confirmed in multiple iterations).

Figure 3:
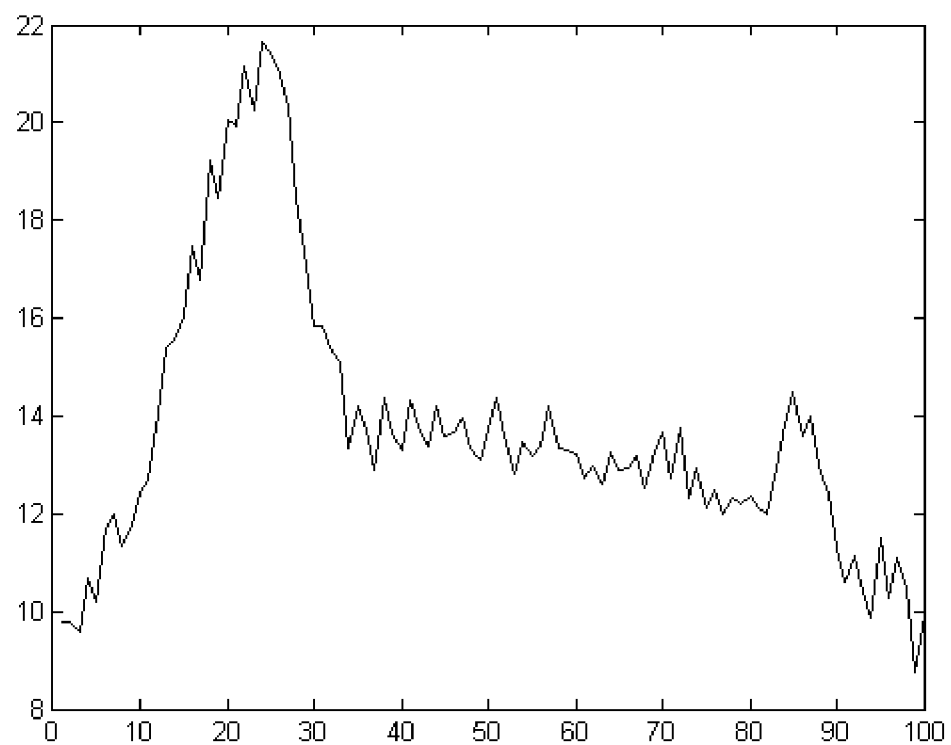
FIG. 3 shows a sample graph of sharpness values with respect to changing focus distances.
Figure 4:
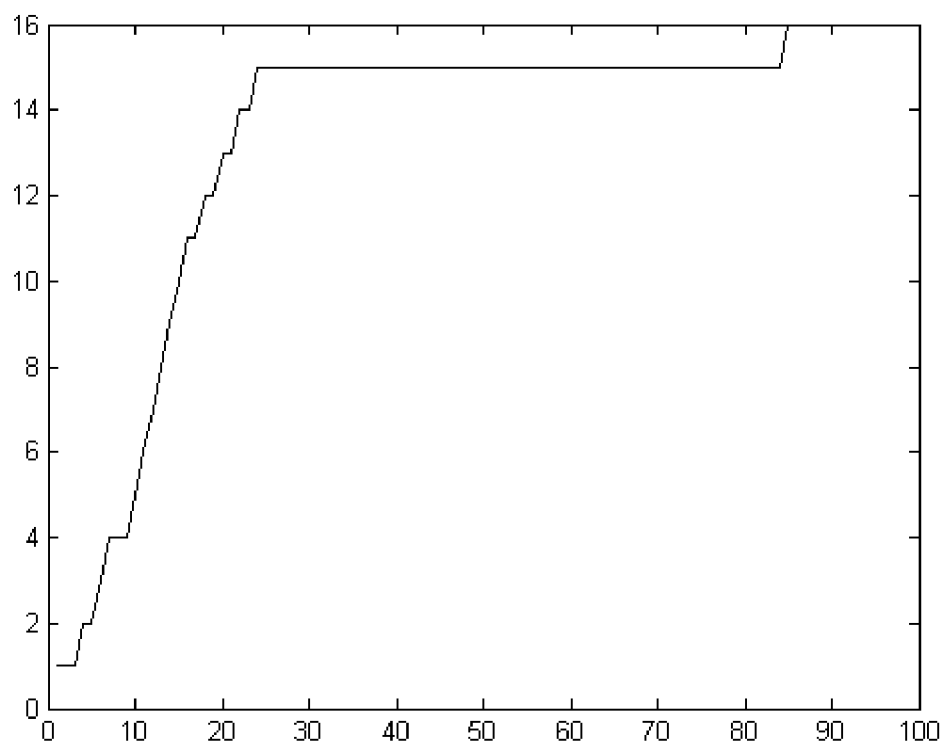
FIG. 4 shows a sample graph of longest increasing subsequence lengths.

FIG. 3 shows a sample graph of sharpness values with respect to changing focus distances which shows sharpness values for all possible focus distances. FIG. 4 shows a sample graph of longest increasing subsequence lengths calculated from the data presented in FIG. 3. There is a clear increasing trend for first part of the FIG. 3 (0-20), however small decreasing parts are present because of noise. Corresponding part in FIG. 4 shows clear increasing trend in LIS length with LIS length remaining constant for noisy parts. Second part of the FIG. 3 (20-100) shows a decreasing trend in general. Corresponding part in FIG. 3 shows a long constant LIS length (this should signal the decreasing trend and initiate termination for the present invention).

In step 107, we clear Idle Counter (IC) if we detect an increase in LIS length (in other words an increase in focus performance is highly probable). Since IC holds number of consecutive unsuccessful iterations (unsuccessful in the sense that focus performance does not increase) we need to set IC to zero after an iteration of focus performance increase. With the current successful iteration we need to keep the distance of best focus performance. In step 108, we store the current position of the optical system as the Best Position (BP). In this step one key issue needs to be kept in mind. In a preferred configuration of this invention where equal step sizes are used and optical positions are set in a consecutive order, system does not need to check if current position has better focus performance than BP, thus directly writing current position to BP is possible. However, if equal step sizes are not used or non-consecutive optical positions are used in consecutive iterations, systems need to check focus performances of BP and current position and replace BP with the current position only if focus quality of current position is higher.

In step 109, we increment Idle Counter (IC) if we detect LIS length stayed the same in current iteration (in other words a decrease in focus performance is detected). Since IC holds number of consecutive unsuccessful iterations (unsuccessful in the sense that focus performance does not increase) we need to increment IC after an iteration of focus performance decrease. In step 110, we check if IC has reached a predetermined threshold. If IC has reached such a threshold (i.e. we have experienced multiple iterations of decreasing focus performance), system may conclude the best focus distance has been passed and we can proactively terminate without calculating any more correspondences (from which we don't expect to find better focus performance). If IC has not reached such a threshold, system may conclude there is not enough evidence that a decreasing trend of focus performance is being processed (system may well be experiencing a (number of) noisy correspondence(s)), thus execution should continue with calculation of next correspondence.

In step 111, we determine if the optical system is at the end of possible discrete positions. Such check is necessary since if control system has driven the motors (5) to an end position (without the method for optimizing focus of an optical system passively (100) has triggered a termination condition) a natural termination condition has been reached. In such cases, termination steps of the method for optimizing focus of an optical system passively (100), needs to be started. On the other hand, if the system is not at a stage of natural termination condition, control system drives the optical system to the next position in step 112 for the next correspondence calculation.

If a termination condition is triggered (either by IC reaching a predetermined threshold or system runs out of discrete optical positions to process) execution of termination steps of the method is started. Step 113, is an optional optimization step. If such step is opt to be carried out, further focus performance improvement around the BP is tried to be achieved. In one of the preferred embodiments of the present invention, the method for optimizing focus of an optical system passively (100) is executed around BP for a limited range, using finer discretization steps than previously employed as step 113. Thus, for such embodiment of the present invention multiple passes with the same method where each pass scanning a more limited range with finer detail is carried out. In another preferred embodiment of the present invention a number of (k) calculated correspondences closest to the BP are used for further optimization. For this preferred embodiment of the present invention, a curve is fitted using k correspondences and BP is replaced with the point on the polynomial that corresponds to the best focus performance. Various modes of the current embodiment can be implemented where polynomial order can change depending on the application. In step 114, control system drives optical system to the BP and method terminates.

A system for optimizing focus of an optical system passively (1) comprises;
at least one processing unit (3) configured to implement the method for optimizing focus of an optical system passively (100); configured to receive image data from sensor device (2);
configured to send desired focus distance to control unit (4); receive current position info from control unit (4); and optionally send/receive user input/status info,
at least one sensor device (2) connected to processing unit (3) configured to obtain image data; and pass obtained image data to processing unit (3) for analysis,
at least one control unit (4) connected to processing unit (3); configured to obtain data regarding desired focus distance from processing unit (3); drive motors (5) of the optical system to obtain focus at a specific distance; and report current focus distance to the processing unit (3),
at least one motor unit (5) connected to control unit (4); configured to modify focus distance of the optical system according to commands of the control unit (4),
optionally one input/output unit (6) connected to processing unit (3); configured to receive/send user commands/info such as step size, status info etc.,
at least one memory unit (7) connected to processing unit (3); configured to store, when necessary, the optimization results found by processing unit (2).

In a preferred embodiment of the present invention, processing unit (3) is configured to receive image data from the sensor device (2), optionally take user input and give status info to user via input/output unit (6), give commands to control unit (4) about where next position (focus distance) of the optical system should be and get status info from control unit (4), and execute method (100). In another embodiment of the present inventive system (1), processing unit (3) does not receive commands and/or sends status info via input/output unit. Instead, preconfigured data can be used and optional input/output unit can be thrown out of the system (1).

Sensor device (2) is preferentially configured to capture a plurality of images where these images are passed to processing unit (3) for passive focus analysis. Control unit (4) is preferentially configured to drive motor unit (5) to achieve correct focus at desired distance. For preferred embodiment of the present invention there needs to be clear one-to-one mapping between captured images and focus distances. Thus, preferentially control unit (4) signals processing unit when driving of optical system at desired distance is finished, then processing unit can have one-to-one mapping between received image from the sensor device (2) and focus distance of the optical system.

Input/output device (6) is preferentially configured to receive discretization input from the user where user could direct the system to fine/coarse grain optimization. Furthermore input/output device (6) can be used to report system status to the user. Input/output device (6) therefore, is any interface device known in the art including monitor, keyboard, mouse, any touch operated device, button, jumper, LED etc.

Memory unit (7) is any volatile or non-volatile memory device known in the art such as a RAM (random access memory), ROM (read-only memory), flash memory or a hard disk. These are used to store input, output or intermediate data related to the said method (100) temporarily or permanently.

The method (100) together with the system (1) can effectively find best focus for an optical system while effectively decreasing execution time spent/images processed for focusing via eliminating calculation of unnecessary correspondences.

Within the scope of these basic concepts, it is possible to develop a wide variety of embodiments of the inventive "system and method for optimizing focus of an optical system passively" (1), (100). The invention cannot be limited to the examples described herein; it is essentially according to the claims.

What is claimed is:

1. A method for optimizing the focus of a camera optical system, comprising:

providing a sensor for capturing images, a processor, a memory, and a control connected to the sensor to control driver motors for focusing the optical system, the processor is configured to implement the method, which comprises the following steps:

discretizing optical positions or focus distances of the optical system;

initializing an idle counter to zero, the idle counter holds a number of iterations when the optical system is unable to improve focus performance;

driving the optical system to a predetermined initial optical position;

initializing a best position, the best position holds a best focusing distance came across up until a current execution iteration, to a current position;

clearing a sharpness array, the sharpness array holds sharpness values of already processed images;

calculating correspondence for at least one image and obtaining a focus distance value and a sharpness value, wherein the focus distance value denotes a focus distance of the optical system for the at least one image, and the sharpness value denotes a sharpness value calculated for the at least one image;

adding at least one sharpness value to the sharpness array;

calculating a longest increasing subsequence on the sharpness array;

checking if a length of the longest increasing subsequence increases;

clearing the idle counter if the length of the longest increasing subsequence increases;

setting the best position to the current position;

incrementing the idle counter if the length of the longest increasing subsequence does not increase;

checking if a termination threshold is reached;

checking if the current position corresponds to an end of discrete optical positions if the termination threshold is not reached;

driving motors to a next position, if the current position does not correspond to the end of discrete optical positions; and, going to the best position and terminating the method, if the termination threshold is reached or if the current position corresponds to the end of discrete optical positions.

2. The method according to claim 1, wherein the discretization of the optical positions is user controlled in the step of discretizing optical positions of the optical system.

3. The method according to claim 1, wherein the predetermined discretization steps are found empirically in the step of discretizing optical positions of the optical system.

4. The method according to claim 1, wherein calculated sharpness values are ordered so that focus distance values of calculated images are ordered consecutively in the step of adding at least one sharpness value to the sharpness array.

5. The method according to claim 1, wherein a sorting pass is carried out on the sharpness array on the focus distance entries in the step of adding at least one sharpness value to the sharpness array, if an overall execution sequence of the focus distance is not ordered.

6. The method according to claim 1, wherein the step of setting the best position to the current position comprises a sub-step of checking focus performances of the best position and the current position and replacing the best position with the current position if a focus quality of the current position is higher.

7. The method according to claim 1, further comprising a step of: improving the best position if the termination threshold is reached or if the current position corresponds to the end of discrete optical positions, then going to best position and terminating the process.

* * * * *